March 18, 1958 R. M. EVANS 2,826,879
KNIFE HOLDER AND CONDITIONER
Filed Aug. 23, 1955 3 Sheets-Sheet 1
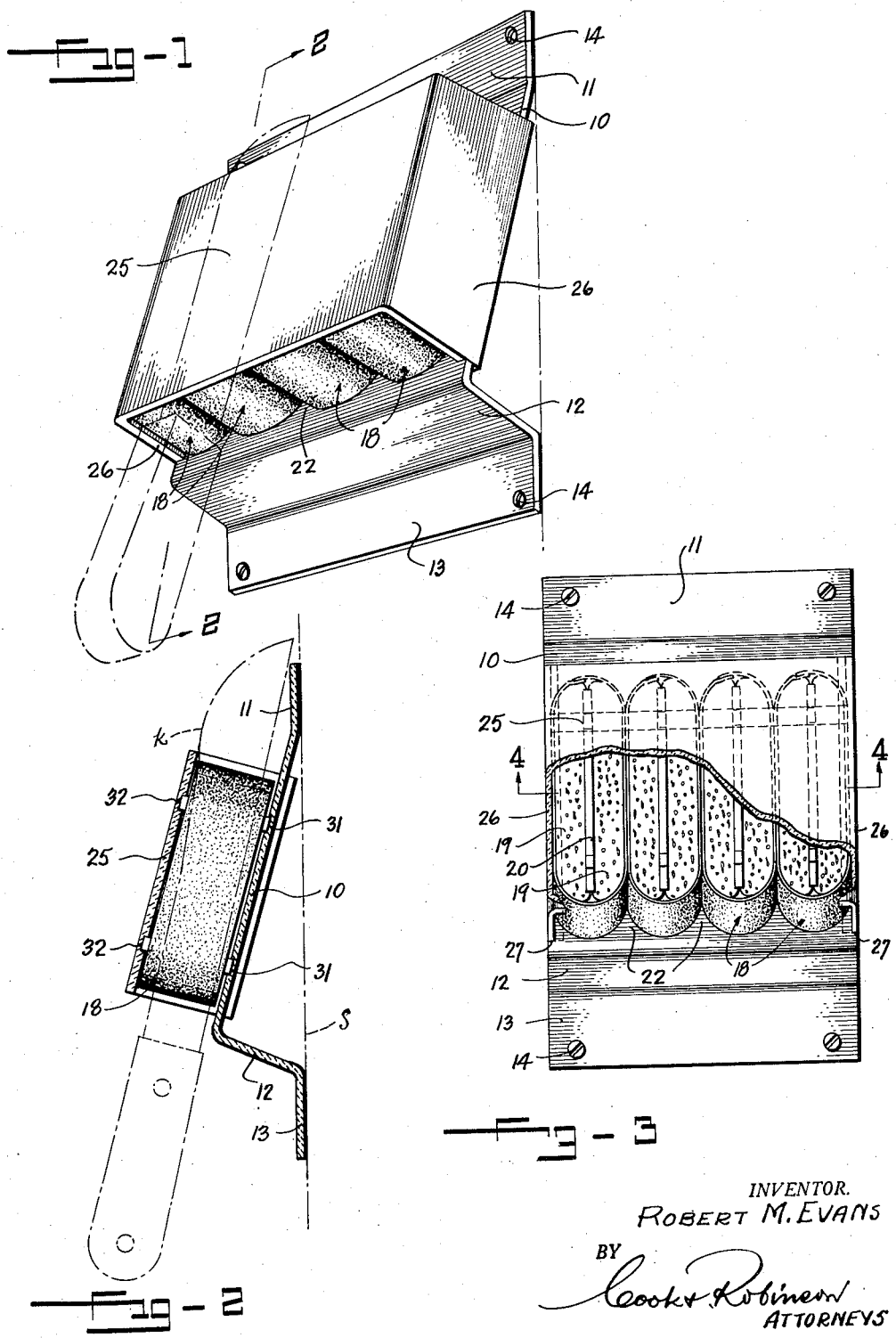
INVENTOR.
ROBERT M. EVANS
BY
Cook + Robinson
ATTORNEYS March 18, 1958 R. M. EVANS 2,826,879
KNIFE HOLDER AND CONDITIONER
Filed Aug. 23, 1955 3 Sheets-Sheet 2

INVENTOR.
ROBERT M. EVANS
BY
Cook + Robinson
ATTORNEYS

March 18, 1958     R. M. EVANS     2,826,879
KNIFE HOLDER AND CONDITIONER
Filed Aug. 23, 1955     3 Sheets-Sheet 3
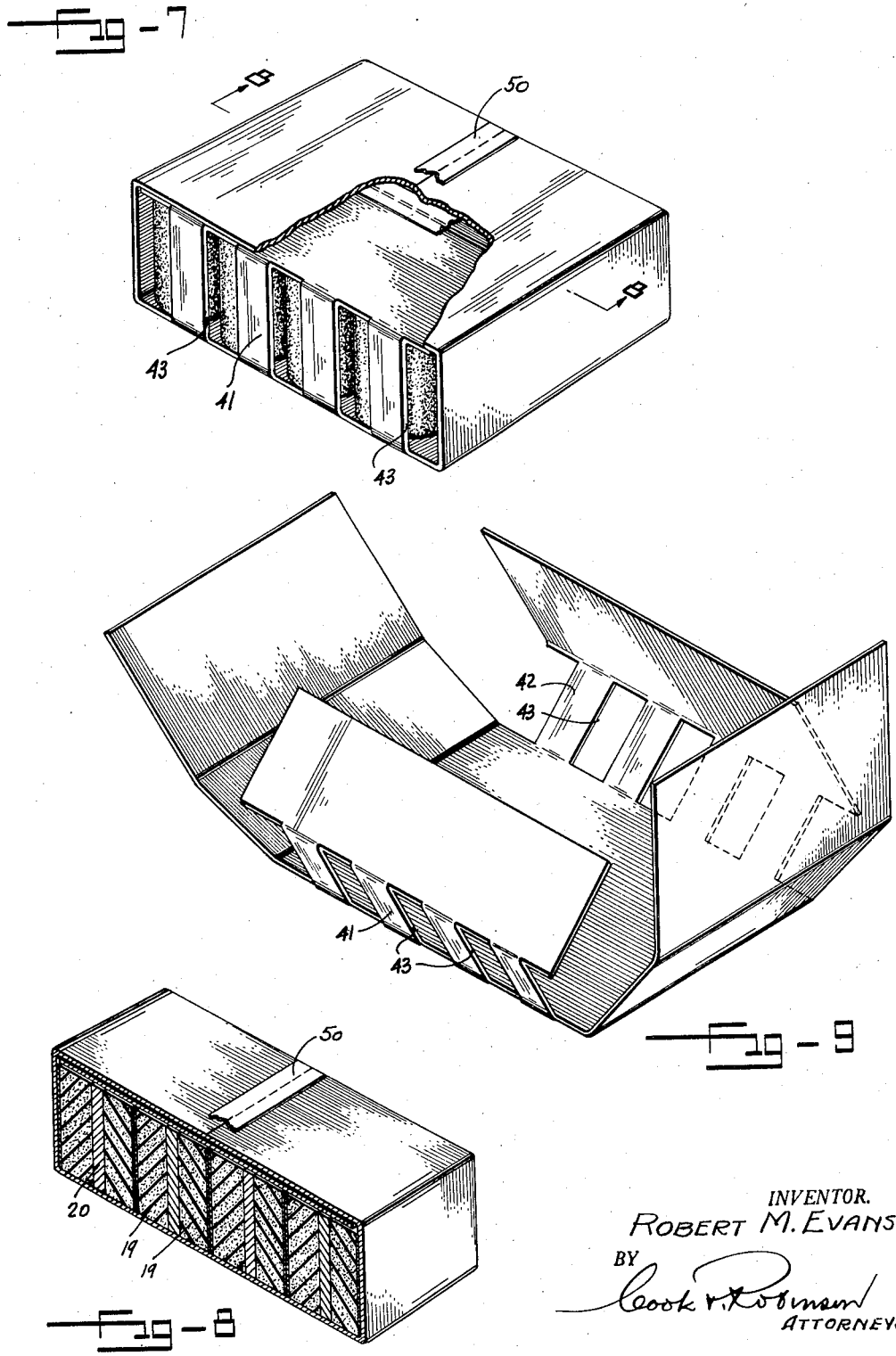
INVENTOR.
ROBERT M. EVANS
BY
*Cook & Robinson*
ATTORNEYS

United States Patent Office 2,826,879
Patented Mar. 18, 1958

2,826,879

KNIFE HOLDER AND CONDITIONER

Robert M. Evans, Seattle, Wash.

Application August 23, 1955, Serial No. 530,021

5 Claims. (Cl. 51—214)

This invention relates to a kitchen accessory which I have designated as a "knife holder and conditioner" and which is designed for the convenient reception of the usual forms of kitchen knives to hold them in readiness and easily accessible for use and which device, through its specific form of knife holding facilities and manner of applying knives thereto, aids in keeping the knife blades in satisfactory condition for their intended uses.

It is the principal object of the present invention to provide a knife holder and conditioner which may be conveniently attached to a support for the easy and ready application of one or more knives thereto, and to hold them when properly applied thereto, for convenient and ready removal for use; and which device is characterized by the provision therein of slots, each designed to receive the blade of a knife therein and which slots are each defined between adjacent surfaces of resilient cushions that are surfaced with a suitable abrasive material which operates, in the projecting of the knife blades into and their removal from the slots, to burnish their surfaces and to sharpen their cutting edges.

It is a further object of the present invention to provide a knife conditioner and holder of the character above disclosed, which is designed for convenient and ready attachment to a flat wall surface; to the face or underside of a kitchen cabinet, or to a side or top of a table or shelf, to hold it in position, to receive and hold the knives in convenient readiness and which holder may be made to accommodate one or more knives, of various kinds and sizes, and to so contain them that any desired knife may be readily selected from among those held, and withdrawn without interference with the others.

It is also an object of my invention to provide a knife holder and conditioner of the present character wherein the paired resilient cushions between which the blades of the knives are individually received, and which define the knife blade receiving slots between them, will yield to conform to the shape, size and character of the blade inserted between them, and will press the abrasive material, with which the cushions are surfaced, against the blade surfaces with an even and firm pressure that yieldably holds the knife as applied to the slot in place, and by reason of that pressure, effects a desired burnishing and edge sharpening action whenever the blade is inserted or withdrawn from its retaining slot.

Further objects and advantages of the invention reside in the details of construction and combination of the parts of the device and in the mode of use of the device, as will hereinafter be described.

In accomplishing these and other objects of the invention, I have provided the improved details of construction, the preferred forms of which are illustrated in the accompanying drawings, wherein:

Fig. 1 is a perspective view of a knife holder and conditioner embodied by the present invention, showing it in its present preferred position of use as applied to a vertical surface.

Fig. 2 is a vertical section through the device, taken substantially on the line 2—2 in Fig. 1.

Fig. 3 is a front view of the device as applied to a wall, with a part of the cushion holding housing broken away for better illustration of the cooperative arrangement of cushions therein.

Fig. 7 is a perspective view showing an alternative form of housing for holding an assembly of resilient cushions.

Fig. 8 is a cross-section taken on line 8—8 in Fig. 7.

Fig. 9 is a perspective view showing the blank as formed and creased for folding to enclose the assembly of cushions.

Figure 4:
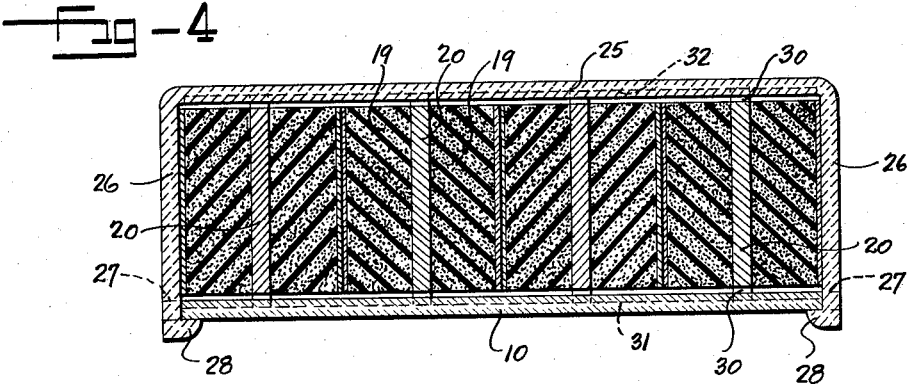
Fig. 4 is an enlarged, horizontal section taken on the line 4—4 in Fig. 3.

Referring more in detail to the drawings:

The knife holder and conditioner which has herein been illustrated is designed to accommodate from one to five knives, but such devices might be made to accommodate a more or less number. Furthermore, the device has been illustrated in Figs. 1 and 2, as being attached to a vertical wall surface to receive the knives thereinto from its underside, but it is to be understood that it might likewise be secured to a vertical surface in a manner to receive knives from its upper end, that is, in a position inverted with respect to its showing in Fig. 2, or it might be fixed to a horizontal surface and serve equally as well.

In its present preferred form of construction the device comprises a back plate 10, formed across its upper edge with an integral attachment flange 11, and across its lower edge with an inturned, offsetting portion 12, terminating along its lower edge in an attaching flange 13. The flanges 11 and 13 are in the same plane and are adapted to be placed flatly against a supporting surface, such as that indicated by the dot and dash lines in Fig. 2, for the functional mounting of the device. Attachment may be made by use of screws or the like, 14, applied through holes formed through the flanges 11 and 13.

The material used for making the back or mounting plate 10 preferably would be sheet plastic, but might be any other suitable material such as sheet metal, wood or cardboard.

Figure 6:
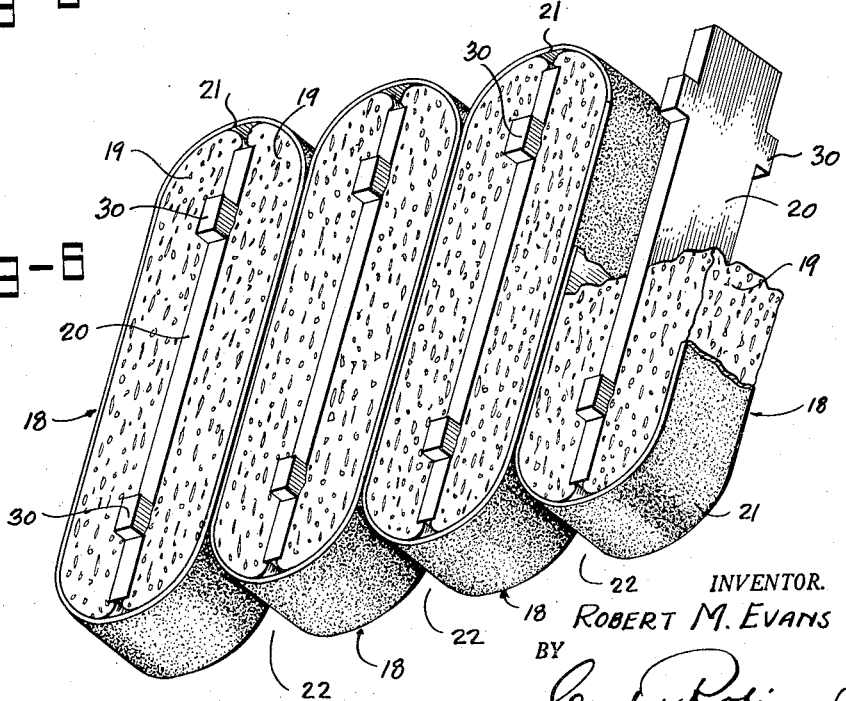
Fig. 6 is a perspective view showing the assembly of cushions and their surfacing bands of abrasive material.

The succession of cushions comprised in the device and between which the knife blades are received, are here shown to be four in number, each designated in its entirety by reference numeral 18. Each cushion 18, as well shown in Figs. 3 and 6, is made up of a pair of sponge rubber pads, 19—19, disposed against opposite faces of a rigid rectangular plate 20 of substantially the same width as the pads. The pads and plate are enclosed in a band or strip 21 of abrasive material such as emery cloth or the like, with its abrasive surface at the outside. The several cushions 18 are all of the same size and all of the oval form, in front elevation, as seen in Fig. 3. The rounded opposite end surfaces of adjacent cushions form entrance mouths, as at 22, for the easy insertion of the blades of knives between the cushions as presently explained.

All of the cushions 18 of the device are enclosed, side by side and under a certain established amount of compression, in a housing member, formed with a flat front wall 25 and opposite end walls 26—26, which latter are adapted to be seated along their back edge portions, in opposite edge recesses 27—27 formed in the supporting back plate 10, and these end walls have inturned hooks 28 along their rear edges designed to holdingly engage with the back side of wall 10 to secure the cushion housing in place. Each of the plates 20 as applied between paired pads is formed, on its longitudinal edges and near its ends with projecting lugs or bosses 30 which are slidably contained in channels 31—34 that are formed transversely across the facing surfaces of the back plate 10 and the front wall 25 of the cushion housing, thus, to keep the cushions 18 as assembled with the plates 20 against upward or downward endwise shifting from the open ends of their enclosing housing.

Figure 5:
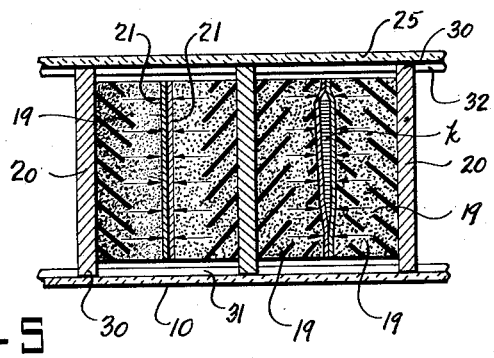
Fig. 5 is a similar sectional detail, illustrating the manner in which the pads of adjacent cushions conform to the side surfaces of the blade as applied between them.

The arrangement of cushions 18 in the housing is as best shown in Figs. 1 and 3, and it will be understood that since the lower and upper ends of the housing are open, the blades of knives may be applied to the slots between cushions as indicated by the dotted line showing of the knife in Figs. 1 and 2. To apply a knife to the holder, the knife blade end is merely placed in an entrance mouth 22 between cushions, and is pushed into the slot between them. As it enters between the cushions their abrasive enclosing or surfacing material operates to burnish the blade and to sharpen its edge. The pressure of the pads against opposite faces of the blade operate to hold the knife in place, and also to give that desired pressure that will effect the burnishing. When in place, the knife blade assumes the position between pads, as seen in Fig. 5.

Should it be desired at any time to replace worn cushions 18, the resilient cushion enclosing housing is sprung sufficiently to disengage one or both of its end walls 26 from the recessed edges of the back plate 10, thus to give access to the cushions. Then the worn cushions can be removed and replaced, or it may require only that new wrappers of abrasive material be applied. It is the intent that the several cushions 18 be used in such number that when in place in the housing, all of the pads comprised therein will be under a certain amount of compression and when a knife blade is inserted in a slot between adjacent cushions, it will be held frictionally between the abrasive surfaces of the adjacent cushions but not with such pressure that application or removal would be difficult or the abrasive effect too severe.

It is further anticipated that resilient cushions which are in themselves an abrasive material might be employed. For example, the pads might be composed of a sponge rubber material impregnated with an abrasive such as emery powder, or emery powder might be adhesively bonded to the surfaces of the resilient pads. In such case, the surfacing strips of emery cloth would be unnecessary.

The alternative or modified form of pad holding housing illustrated by Figs. 7, 8 and 9 eliminates the use of the lugs 30 on the opposite side edges of the plates 20, and the channeling 31—34 of the back plate 10 and housing wall 25 to contain these lugs. In this device, as shown in Fig. 9, the housing is formed from a single blank of sheet material which is cut, scored and folded to form a rectangular and box-like housing for a specified number of pads 18. In its formation, the housing is provided with upper and lower end closures 41 and 42 instead of being open as is the housing of Fig. 2, and these are slotted, as at 43 to receive the knife blades therethrough. The end closure members, in this case engage with ends of the enclosed cushions thus to hold the latter in place. Otherwise the cushions are made in accordance with those previous disclosures. The housing as thus formed might be applied or fixed to a mounting in any suitable manner. The housing 40, thus formed from cardboard, or any other suitable sheet material, after being folded about a pack of pads 18 as shown in Fig. 1 can have its joining edges taped and sealed together as indicated at 50, thus to hold the pack secure. The package could then be applied to a holder, or otherwise fixed to a support to serve in the same manner as the device of Fig. 1.

It is anticipated that devices of this kind can be made in various shapes, designs, and sizes to accommodate from one to a large number of knives. Also, it is anticipated that the pads used in the make up of the cushions might be of any resilient material, or even air inflated pads or cushions embodying springs of various kinds whereby the abrasive material would be pressed against the surfaces of entering knives with uniformity of pressure.

Further, it is anticipated that the pack "Fig. 7" will be used as a sharpening device instead of a stone or wheel, thus producing a properly sharpened knife even in unskilled hands.

Devices of this kind are relatively inexpensive; effective in their intended uses and easy to mount for convenient use.

Having thus described my invention, what I claim as new therein and desire to secure by Letters Patent is:

1. A knife holder and conditioner comprising a housing, a succession of elongated cushions confined therein under compression, each in face-to-face contact with the cushions next adjacent thereto, and providing slots between its opposite side faces and the faces of the next adjacent pads for the insertion of the blades of knives flatly between the cushions for the convenient holding of the knives; said housing being open at opposite ends to permit application of the knife blades to the slots between cushions from either end thereof, and said cushions having abrasive strips applied over their surfaces whereby the application to and withdrawal of the blades from said slots effects the burnishing of their surfaces and sharpening of their edges.

2. A knife holder and conditioner comprising a housing, a succession of elongated cushions confined therein face to face and under compression and adapted to receive the blades of knives flatly between the engaged faces of adjacent cushions; each of said cushions comprising a substantially rigid plate, a pair of resilient pads of substantially the same width and length as said rigid plate disposed at opposite sides thereof and a wrapper of strip form applied endwise about the assembled plate with compressing effect on the pads, said strip having an abrasive outer surface.

3. A knife holder and conditioner as recited in claim 2 including a mounting plate adapted to be fixed to a support and to which said housing is detachably fixed; said housing having an open side through which said cushions may be applied thereto or removed therefrom when said housing is detached, and which open side is closed by said plate when the housing is secured thereto.

4. A knife holder and conditioner as recited in claim 3 wherein said mounting plate is recessed at opposite edges, and wherein said housing comprises a front wall and opposite side walls formed integral therewith; said sidewalls being adapted to be received along their rear edges in said edge recess of the plate for the functional attachment of said housing to the mounting plate, and said housing being of a resilient material that may be sprung for the unseating or seating of the sidewall members thereof in said recesses.

5. A knife holder and conditioner according to claim 2 wherein each cushion further comprises a pair of resilient pads disposed against opposite sides of said substantially rigid plate and a wrapper of strip form, with an abrasive outer surface applied endwise about the assembled plate and pads; and wherein the cushion enclosing housing has surfaces thereof transversely channeled, and said rigid plates of each cushion are formed at opposite edges with lugs contained slidably in said channels to permit movement of the pads under influence of varying pressure applied thereagainst but preventing endwise movement incident to the applying of knives to or their removal from the slots.

(References on following page)

References Cited in the file of this patent

UNITED STATES PATENTS

| | | |
|---|---|---|
| 409,742 | Fowler | Aug. 27, 1889 |
| 651,644 | Abbott | June 12, 1900 |
| 1,173,549 | Blair | Feb. 29, 1916 |
| 1,861,683 | Branch | June 7, 1932 |
| 2,413,169 | Case | Dec. 24, 1946 |

FOREIGN PATENTS

| | | |
|---|---|---|
| 15,629 | Great Britain | Feb. 8, 1906 |